US009838437B2

(12) United States Patent
Qin

(10) Patent No.: US 9,838,437 B2
(45) Date of Patent: Dec. 5, 2017

(54) METHOD, DEVICE, AND SYSTEM FOR IMPLEMENTING PROMPTING AND COLLECTING USER INFORMATION

(71) Applicant: Huawei Technologies Co., Ltd., Shenzhen, Guangdong (CN)

(72) Inventor: Shuang Qin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 102 days.

(21) Appl. No.: 14/979,379

(22) Filed: Dec. 27, 2015

(65) Prior Publication Data

US 2016/0182572 A1 Jun. 23, 2016

Related U.S. Application Data

(63) Continuation of application No. PCT/CN2013/084730, filed on Sep. 30, 2013.

(30) Foreign Application Priority Data

Jun. 26, 2013 (CN) .......................... 2013 1 0261178

(51) Int. Cl.
*H04B 7/00* (2006.01)
*H04L 29/06* (2006.01)
(Continued)

(52) U.S. Cl.
CPC ...... *H04L 65/1016* (2013.01); *H04L 65/1006* (2013.01); *H04L 65/1063* (2013.01);
(Continued)

(58) Field of Classification Search
CPC ....... H04W 8/18; H04W 8/183; H04W 8/186; H04W 8/26
(Continued)

(56) References Cited

U.S. PATENT DOCUMENTS 6,975,709 B2* 12/2005 Wullert, II ............ H04M 1/642
379/88.23
8,149,998 B2* 4/2012 Li ..................... H04M 3/42017
379/142.01
(Continued)

FOREIGN PATENT DOCUMENTS

CN 1874327 A 12/2006
CN 101043548 A 9/2007
(Continued)

OTHER PUBLICATIONS

G. Camarillo, et al., "Early Media and Ringback Tone Generation in the Session Initiation Protocol", Internet Engineering Task Force, Internet Draft, Feb. 10, 2003, 10 pages.
(Continued)

*Primary Examiner* — Dmitry H Levitan

(57) ABSTRACT

The present invention discloses a method, a device, and a system for implementing prompting and collecting user information, and belongs to the field of computer networks. The method includes: obtaining, by an AIP device, ETC operation information forwarded by an IMS network side entity and carrying prompting and collecting user information information, where the ETC operation information is sent by a service control point SCP, and the prompting and collecting user information information includes a routing address of the AIP device, an ID of the SCP, and a service correlation ID; establishing, by the AIP device, a connection with the SCP through the IMS network side entity according to the prompting and collecting user information information carried in the ETC operation information; and interacting, by the AIP device, with the SCP according to the established connection, so as to complete a prompting and collecting user information process.

27 Claims, 6 Drawing Sheets

An IMS network side entity obtains ETC operation information sent by an SCP and carrying voice playback and digit collection information, where the voice playback and digit collection information includes a routing address of an AIP device, an ID of the SCP, and a service correlation ID — 301

The IMS network side entity forwards the ETC operation information to the AIP device, so that the AIP device establishes a connection with the SCP according to the voice playback and digit collection information carried in the ETC operation information, and interacts with the SCP according to the established connection, so as to complete a voice playback and digit collection process — 302

(51) Int. Cl.
*H04M 3/493* (2006.01)
*H04W 76/02* (2009.01)

(52) U.S. Cl.
CPC ........ H04L 65/1069 (2013.01); H04M 3/493 (2013.01); H04W 76/022 (2013.01)

(58) Field of Classification Search
USPC ........ 370/310, 328, 329, 346, 349, 464, 465
See application file for complete search history.

(56) References Cited

U.S. PATENT DOCUMENTS

| | | | | |
|---|---|---|---|---|
| 8,233,476 | B2* | 7/2012 | Noldus | H04L 29/12783 370/356 |
| 8,498,222 | B2* | 7/2013 | Brooks | H04L 45/00 370/254 |
| 8,625,620 | B2* | 1/2014 | Shiga | H04L 63/20 370/410 |
| 8,634,318 | B2* | 1/2014 | Shiga | H04L 12/413 370/252 |
| 9,542,074 | B2* | 1/2017 | Mauro | G06F 3/0482 |
| 2007/0071217 | A1* | 3/2007 | Min | H04M 3/387 379/221.08 |
| 2007/0133575 | A1 | 6/2007 | Cai et al. | |
| 2007/0281669 | A1* | 12/2007 | Jiang | H04M 3/44 455/414.1 |
| 2008/0226052 | A1* | 9/2008 | Peng | H04M 3/42 379/207.02 |
| 2009/0257363 | A1 | 10/2009 | Benco et al. | |
| 2010/0082972 | A1* | 4/2010 | Benco | G06Q 30/02 713/155 |
| 2012/0259985 | A1* | 10/2012 | Koskela | H04W 48/16 709/227 |
| 2013/0094633 | A1 | 4/2013 | Mauro | |

FOREIGN PATENT DOCUMENTS

| | | |
|---|---|---|
| CN | 101247431 A | 8/2008 |
| EP | 1 677 485 A1 | 7/2006 |
| EP | 1 830 548 A1 | 9/2007 |
| JP | 2008509612 A | 3/2008 |
| JP | 2011160220 A | 8/2011 |
| WO | 2012/104712 A2 | 8/2012 |

OTHER PUBLICATIONS

"3rd Generation Partnership Project; Technical Specification Group Core network and Terminals; Interworking between the IP Multimedia (IM) Core Network (CN) Subsystem (IMS) and MSC Server for IMS Centralized Services (ICS) (Release 12)", 3GPP TS 29.292 V12.0.0, Jun. 2013, 57 pages.

"3rd Generation Partnership Project; Technical Specification Group Core Network and Terminals; Customized Applications for Mobile network Enhanced Logic (CAMEL) Phase 4; CMEL Application Part (CAP) specification for IP Multimedia Subsystems (IMS)(Release 12)", 3GPP TS 29.278 V12.0.0, Jun. 2013, 45 pages.

"3rd Generation Partnership Project; Technical Specification Group Core Network and Terminals; Customized Applications for Mobile network Enhanced Logic (CAMEL) Phase 4; Stage 2; IM CN Interworking (Release 11)", 3GPP TS 23.278 V11.0.1, Oct. 2012, 153 pages.

* cited by examiner

METHOD, DEVICE, AND SYSTEM FOR IMPLEMENTING PROMPTING AND COLLECTING USER INFORMATION

CROSS-REFERENCE TO RELATED APPLICATIONS

This application is a continuation of International Application No. PCT/CN2013/084730, filed on Sep. 30, 2013, which claims priority to Chinese Patent Application No. 201310261178.7, filed on Jun. 26, 2013, both of which are hereby incorporated by reference in their entireties.

TECHNICAL FIELD

The present invention relates to the field of computer networks, and in particular, to a method, a device, and a system for implementing prompting and collecting user information.

BACKGROUND

An existing computer network can provide various intelligent services for a user, one of which is an intelligent service having a prompting and collecting user information function. Through the prompting and collecting user information function, a pre-recorded voice may be played for a user, and after a number input by the user is received, the voice is further played for the user or another service is provided for the user according to the received number. In a conventional 2G/3G (Second Generation/Third Generation) network, to implement the prompting and collecting user information function, an AIP (Advanced Intelligent Peripheral, advanced intelligent peripheral) device located at a core layer pre-stores a voice required by an intelligent service, and an SCP (Service Control Point, service control point) located at a service layer controls, according to a customized intelligent service, the AIP device at the core layer to implement the prompting and collecting user information function. However, with rapid development of computer network technologies, an IMS (Internet Protocol Multimedia Subsystem, Internet Protocol Multimedia Subsystem) network is introduced based on the original 2G/3G network, a data transmission function of the core layer in the original 2G/3G network is replaced with the IMS network, as shown in FIG. 1. Therefore, how to implement the prompting and collecting user information function in the IMS network becomes a key issue.

In the prior art, during implementation of prompting and collecting user information in the IMS network, an MRFP (Multimedia Resource Function Processor, multimedia resource function processor) in the IMS network pre-stores the voice required by an intelligent service of prompting and collecting user information; the MRFP in the IMS network receives a voice playback request that is sent by the SCP and forwarded by an MRFC (Multimedia Resource Function Controller, multimedia resource function controller) in the IMS network, where the voice playback request carries a voice ID (Identifier, identifier) and a digit collection rule; and the MRFP implements the prompting and collecting user information function according to the voice ID and the digit collection rule.

During the implementation of the present invention, the inventor finds that the prior art has at least the following problem:

In the prior art, the MRFP in the IMS network implements the prompting and collecting user information function. Before the IMS network is introduced, the voice required by the intelligent service of prompting and collecting user information is stored in the AIP device, and after the IMS network is introduced, the voice stored in the AIP device needs to be transferred to the MRFP in the INS network, and the AIP device is discarded; therefore waste of a network device is caused and user service experience is also lost. In addition, compared with the MRFP, the AIP device can provide more abundant services, and therefore, when the AIP device is discarded, the IMS network is introduced, and the MRFP implements the prompting and collecting user information function, the function implemented by the MRFP has certain limitations.

SUMMARY

To solve the problem in the prior art, embodiments of the present invention provide a method, a device, and a system for implementing prompting and collecting user information. The technical solutions are as follows:

In a first aspect, a method for implementing prompting and collecting user information is provided, where an AIP device pre-stores a voice required by a prompting and collecting user information function, and the AIP device is connected to an IMS network through an Internet Protocol Multimedia Subsystem IMS network side entity, and the method includes:

obtaining, by the AIP device, ETC (Establish Temporary Connection, establish temporary connection) operation information forwarded by the IMS network side entity and carrying prompting and collecting user information information, where the ETC operation information is sent by an SCP, and the prompting and collecting user information information includes a routing address of the AIP device, an identifier ID of the SCP, and a service correlation ID;

establishing, by the AIP device, a connection with the SCP through the IMS network side entity according to the prompting and collecting user information information carried in the ETC operation information; and interacting, by the AIP device, with the SCP according to the established connection, so as to complete a prompting and collecting user information process.

With reference to the first aspect, in a first possible implementation manner of the first aspect, the IMS network side entity is an MGCF (Media Gateway Control Function, media gateway control function) entity, and the MGCF entity is connected to the SCP through a CSCF (Call Session Control Function, call session control function) entity, and an IM-SSF (IP Multimedia Service Switch Function, Internet Protocol IP Multimedia Service Switch Function) entity; and the obtaining, by the AIP device, ETC operation information sent by the IMS network side entity and carrying prompting and collecting user information information includes:

obtaining, by the AIP device, the ETC operation information forwarded by the MGCF entity and carrying the prompting and collecting user information information, where the ETC operation information is sent by the IM-SSF entity to the MGCF entity through the CSCF entity after being sent by the SCP to the IM-SSF entity.

With reference to the first possible implementation manner of the first aspect, in a second possible implementation manner of the first aspect, an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and the obtaining, by the AIP device, the ETC operation information forwarded by the MGCF entity and carrying the prompting and collecting user information information includes:

receiving, by the AIP device, an IAM (Initial Address Message, initial address message) sent by the MGCF entity and carrying the ETC operation information, so that the AIP device obtains the ETC operation information from the IAM.

With reference to the first aspect, in a third possible implementation manner of the first aspect, the INS network side entity is an IM-SSF entity, and the IM-SSF entity is connected to the SCP; and the obtaining, by the AIP device, ETC operation information sent by the IMS network side entity and carrying prompting and collecting user information information includes:

obtaining, by the AIP device, the ETC operation information forwarded by the IM-SSF entity and carrying the prompting and collecting user information information, where the ETC operation information is sent by the SCP to the IM-SSF entity.

With reference to the third possible implementation manner of the first aspect, in a fourth possible implementation manner of the first aspect, an interface between the IM-SSF entity and the SCP is extended to support an ETC operation; and the obtaining, by the AIP device, the ETC operation information forwarded by the IM-SSF entity and carrying the prompting and collecting user information information includes:

receiving, by the AIP device, an IAM sent by the IM-SSF entity and carrying the ETC operation information, so that the AIP device obtains the ETC operation information from the IAM message.

With reference to the first aspect, and any one of the first to the fourth possible implementation manners of the first aspect, in a fifth possible implementation manner of the first aspect, the interacting, by the AIP device, with the SCP according to the established connection, so as to complete a prompting and collecting user information process includes:

receiving, by the AIP device, a voice playback request delivered by the SCP and carrying voice playback content, and performing a voice playback operation according to the voice playback request; and/or receiving, by the AIP device, a prompting and collecting user information instruction delivered by the SCP, and performing a prompting and collecting user information operation according to the prompting and collecting user information request.

With reference to the first aspect, and any one of the first to the fifth possible implementation manners of the first aspect, in a sixth possible implementation manner of the first aspect, after the interacting, by the AIP device, with the SCP according to the established connection, so as to complete a prompting and collecting user information process, the method further includes:

receiving, by the AIP device, a REL (Release Message, release message) sent by the IMS network side entity, releasing a resource and disconnecting from the SCP according to the REL, and returning a resource release completion message to the IMS network side entity, so that the IMS network side entity returns the resource release completion message to the SCP, where the REL is sent after the INS network side entity receives a DFC (Disconnect Forward Connection, disconnect forward connection) instruction delivered by the SCP.

In a second aspect, a device is provided, where the device AIP device pre-stores a voice required by a prompting and collecting user information function, and the AIP device is connected to an IMS network through an Internet Protocol Multimedia Subsystem IMS network side entity, the AIP device including:

an obtaining module, configured to obtain establish temporary connection ETC operation information forwarded by the IMS network side entity and carrying prompting and collecting user information information, where the ETC operation information is sent by an SCP, and the prompting and collecting user information information includes a routing address of the AIP device, an identifier ID of the SCP, and a service correlation ID;

a connection module, configured to establish a connection with the SCP through the INS network side entity according to the prompting and collecting user information information carried in the ETC operation information; and an interaction module, configured to interact with the SCP according to the established connection, so as to complete a prompting and collecting user information process.

With reference to the second aspect, in a first possible implementation manner of the second aspect, the IMS network side entity is an MGCF entity, and the MGCF entity is connected to the SCP through a CSCF entity and an IM-SSF entity; and the obtaining module includes:

a first obtaining unit, configured to obtain the ETC operation information forwarded by the MGCF entity and carrying the prompting and collecting user information information, where the ETC operation information is sent by the IM-SSF entity to the MGCF entity through the CSCF entity after being sent by the SCP to the IM-SSF entity.

With reference to the first possible implementation manner of the second aspect, in a second possible implementation manner of the second aspect, an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and the first obtaining unit is configured to receive an IAM sent by the MGCF entity and carrying the ETC operation information, so that the AIP device obtains the ETC operation information from the IAM.

With reference to the second aspect, in a third possible implementation manner of the second aspect, the IMS network side entity is an IM-SSF entity, and the IM-SSF entity is connected to the SCP; and the obtaining module includes:

a second obtaining unit, configured to obtain the ETC operation information forwarded by the IM-SSF entity and carrying the prompting and collecting user information information, where the ETC operation information is sent by the SCP to the IM-SSF entity.

With reference to the third possible implementation manner of the second aspect, in a fourth possible implementation manner of the second aspect, an interface between the IM-SSF entity and the SCP is extended to support an ETC operation; and the second obtaining unit is configured to receive an IAM sent by the IM-SSF entity and carrying the ETC operation information, so that the AIP device obtains the ETC operation information from the IAM.

With reference to the second aspect, and any one of the first to the fourth possible implementation manners of the second aspect, in a fifth possible implementation manner of the second aspect, the interaction module is configured to receive a voice playback request delivered by the SCP and carrying voice playback content, and perform a voice playback operation according to the voice playback request; and/or, receive a prompting and collecting user information instruction delivered by the SCP, and perform a prompting and collecting user information operation according to the prompting and collecting user information request.

With reference to the second aspect, and any one of the first to the fifth possible implementation manners of the second aspect, in a sixth possible implementation manner of the second aspect, the device further includes:

a receiving module, configured to receive a REL sent by the INS network side entity;

a releasing module, configured to release a resource and disconnect from the SCP according to the REL; and a returning module, configured to return a resource release completion message to the IMS network side entity, so that the IMS network side entity returns the resource release completion message to the SCP, where the REL is sent after the IMS network side entity receives a DFC instruction delivered by the SCP.

In a third aspect, a method for implementing prompting and collecting user information is provided, where an AIP device pre-stores a voice required by a prompting and collecting user information function, and the AIP device is connected to an IMS network through an Internet Protocol Multimedia Subsystem INS network side entity, and the method includes:

obtaining, by the INS network side entity, ETC operation information sent by an SCP and carrying prompting and collecting user information information, where the prompting and collecting user information information includes a routing address of the AIP device, an identifier ID of the SCP, and a service correlation ID; and forwarding, by the IMS network side entity, the ETC operation information to the AIP device, so that the AIP device establishes a connection with the SCP according to the prompting and collecting user information information carried in the ETC operation information, and interacts with the SCP according to the established connection, so as to complete a prompting and collecting user information process.

With reference to the third aspect, in a first possible implementation manner of the third aspect, the INS network side entity is an MGCF entity, and the MGCF entity is connected to the SCP through a call CSCF entity and an IM-SSF entity; and the obtaining, by the INS network side entity, ETC operation information sent by an SCP and carrying prompting and collecting user information information includes:

obtaining, by the MGCF entity, the ETC operation information forwarded by the IM-SSF entity through the CSCF entity and carrying the prompting and collecting user information information, where the ETC operation information is sent by the SCP to the IM-SSF entity.

With reference to the first possible implementation manner of the third aspect, in a second possible implementation manner of the third aspect, an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and the forwarding, by the IMS network side entity, the ETC operation information to the AIP device includes:

sending, by the MGCF entity, an IAM carrying the ETC operation information to the AIP device, so that the AIP device obtains the ETC operation information from the IAM.

With reference to the third aspect, in a third possible implementation manner of the third aspect, the IMS network side entity is an IM-SSF entity, and the IM-SSF entity is connected to the SCP; and the obtaining, by the IMS network side entity, ETC operation information sent by an SCP and carrying prompting and collecting user information information includes:

obtaining, by the IM-SSF entity, the ETC operation information sent by an SCP and carrying the prompting and collecting user information information.

With reference to the third possible implementation manner of the third aspect, in a fourth possible implementation manner of the third aspect, an interface between the IM-SSF entity and the SCP is extended to support an ETC operation; and the forwarding, by the IMS network side entity, the ETC operation information to the AIP device includes:

sending, by the IM-SSF entity, an IAM carrying the ETC operation information to the AIP device, so that the AIP device obtains the ETC operation information from the IAM.

With reference to the third aspect, and any one of the first to the fourth possible implementation manners of the third aspect, in a fifth possible implementation manner, after the forwarding, by the IMS network side entity, the ETC operation information to the AIP device, the method further includes:

receiving a DFC instruction delivered by the SCP, and sending a REL to the AIP device according to the DFC instruction, so that the AIP device releases a resource and disconnects the SCP according to the REL; and receiving a resource release completion message returned by the AIP device, and returning the resource release completion message to the SCP.

In a fourth aspect, an Internet Protocol Multimedia Subsystem network side entity is provided, where an AIP device pre-stores a voice required by a prompting and collecting user information function, and the AIP device is connected to an IMS network through an Internet Protocol Multimedia Subsystem IMS network side entity, and the entity includes:

an obtaining module, configured to obtain ETC operation information sent by an SCP and carrying prompting and collecting user information information, where the prompting and collecting user information information includes a routing address of the AIP device, an identifier ID of the SCP, and a service correlation ID; and a forwarding module, configured to forward the ETC operation information to the AIP device, so that the AIP device establishes a connection with the SCP according to the prompting and collecting user information information carried in the ETC operation information, and interacts with the SCP according to the established connection, so as to complete a prompting and collecting user information process.

With reference to the fourth aspect, in a first possible implementation manner of the fourth aspect, the IMS network side entity is an MGCF entity, and the MGCF entity is connected to the SCP through a call CSCF entity and an IM-SSF entity; and the obtaining module includes:

a first obtaining unit, configured to obtain ETC operation information forwarded by the IM-SSF entity through the CSCF entity and carrying the prompting and collecting user information information, where the ETC operation information is sent by the SCP to the IM-SSF entity.

With reference to the first possible implementation manner of the fourth aspect, in a second possible implementation manner of the fourth aspect, an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and the forwarding module includes:

a first sending unit, configured to send an IAM carrying the ETC operation information to the AIP device, so that the AIP device obtains the ETC operation information from the IAM.

With reference to the fourth aspect, in a third possible implementation manner of the fourth aspect, the IMS network side entity is an IM-SSF entity, and the IM-SSF entity is connected to the SCP; and the obtaining module includes:

a second obtaining unit, configured to obtain the ETC operation information sent by the SCP and carrying the prompting and collecting user information information.

With reference to the third possible implementation manner of the fourth aspect, in a fourth possible implementation manner of the fourth aspect, an interface between the IM-SSF entity and the SCP is extended to support an ETC operation; and the forwarding module includes:

a second sending unit, configured to send an IAM carrying the ETC operation information to the AIP device, so that the AIP device obtains the ETC operation information from the IAM.

With reference to the fourth aspect, and any one of the first to the fourth possible implementation manners of the fourth aspect, in a fifth possible implementation manner of the fourth aspect, the IMS network side entity further includes:

a first receiving module, configured to receive a DFC instruction delivered by the SCP;

a sending module, configured to send a REL to the AIP device according to the DFC instruction, so that the AIP device releases a resource and disconnects the SCP according to the REL;

a second receiving module, configured to receive a resource release completion message returned by the AIP device; and a returning module, configured to return the resource release completion message to the SCP.

In a fifth aspect, a system for implementing prompting and collecting user information is provided, the system including: an AIP device and an Internet Protocol Multimedia Subsystem IMS network side entity, where the AIP device is the device according to the second aspect or any possible implementation manner of the second aspect; and the IMS network side entity is the entity according to the fourth aspect or any possible implementation manner of the fourth aspect.

Beneficial effects brought by the technical solutions provided in the embodiments of the present invention are as follows:

In the present invention, the IMS network side entity sends the ETC operation information carrying the prompting and collecting user information information to the AIP device, so that the AIP device establishes the connection with the SCP according to the ETC operation information, and then interacts with the SCP through the connection, thereby completing the prompting and collecting user information process, implementing that the AIP device is supported to complete the prompting and collecting user information function in the IMS network, reducing loss of user service experience caused by introduction of the IMS network, and at the same time inheriting an existing device to a largest extent.

BRIEF DESCRIPTION OF THE DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
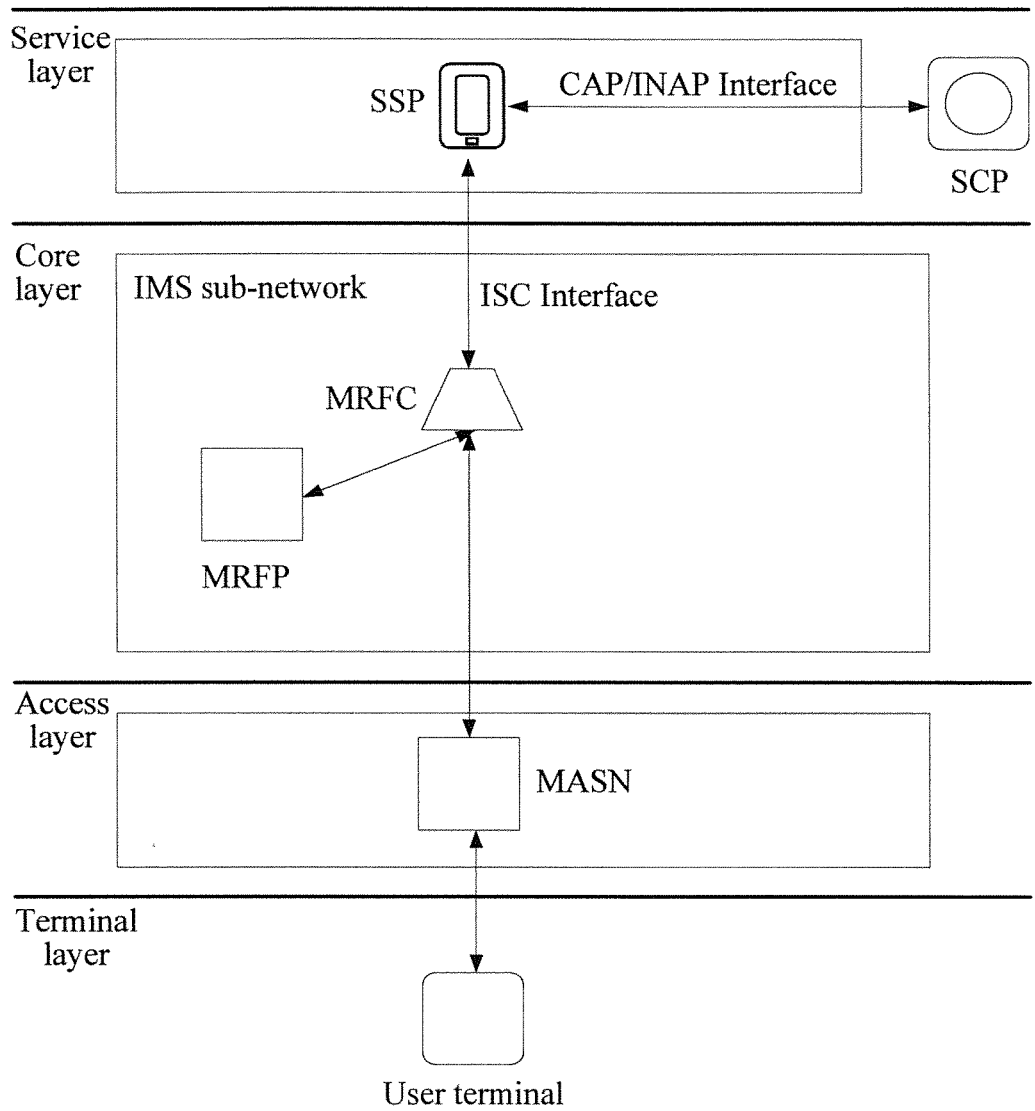
FIG. 1 is a schematic diagram of a network architecture according to the prior art.
Figure 2:
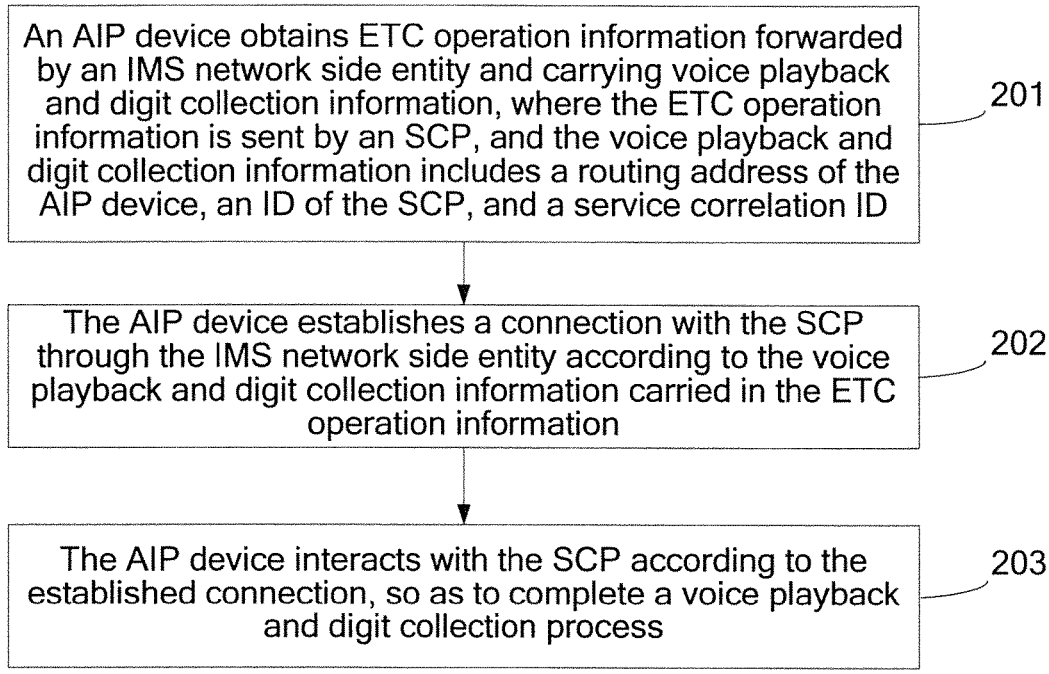
FIG. 2 is a flowchart of a method for implementing prompting and collecting user information according to Embodiment 1 of the present invention.

In order to implement that after an IMS network is introduced, an AIP device can be used to implement prompting and collecting user information, an embodiment of the present invention provides a method for implementing prompting and collecting user information. It is used as an example that the method is implemented from the perspective of the AIP device, the AIP device pre-stores a voice required by a prompting and collecting user information function, and the AIP device is connected to an IMS network through an IMS network side entity. Referring to FIG. 2, a procedure of the method includes:

201: An AIP device obtains ETC operation information forwarded by an INS network side entity and carrying prompting and collecting user information information, where the ETC operation information is sent by an SCP, and the prompting and collecting user information information includes a routing address of the AIP device, an identifier ID of the SCP, and a service correlation ID.

202: The AIP device establishes a connection with the SCP through the IMS network side entity according to the prompting and collecting user information information carried in the ETC operation information.

203: The AIP device interacts with the SCP according to the established connection, so as to complete a prompting and collecting user information process.

Figure 3:
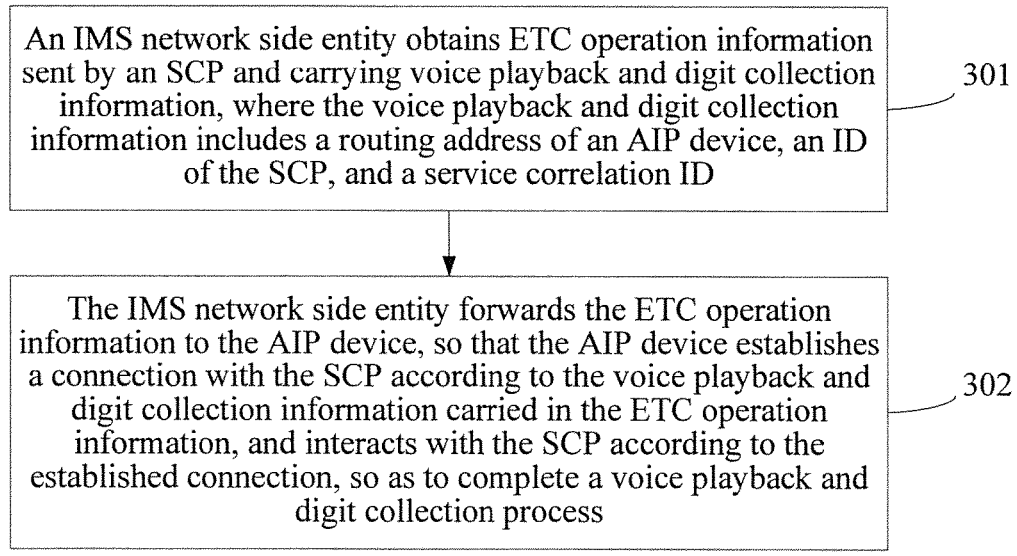
FIG. 3 is a flow chart of another method for implementing prompting and collecting user information according to Embodiment 1 of the present invention.

Further, in the method, that the method is implemented from the perspective of the IMS network side entity is used as an example, the AIP device pre-stores the voice required by the prompting and collecting user information function, and the AIP device is connected to the IMS network through the IMS network side entity. Referring to FIG. 3, a procedure of the method includes:

301: An INS network side entity obtains ETC operation information sent by an SCP and carrying prompting and collecting user information information, where the prompting and collecting user information information includes a routing address of an AIP device, an identifier ID of the SCP, and a service correlation ID.

302: The IMS network side entity forwards the ETC operation information to the AIP device, so that the AIP device establishes a connection with the SCP according to the prompting and collecting user information information carried in the ETC operation information, and interacts with the SCP according to the established connection, so as to complete a prompting and collecting user information process.

In the method provided in this embodiment, the IMS network side entity sends the ETC operation information carrying the prompting and collecting user information information to the AIP device, so that the AIP device establishes the connection with the SCP according to the ETC operation information, and then interacts with the SCP through the connection, thereby completing the prompting and collecting user information process, implementing that the AIP device is supported to complete the prompting and collecting user information function in the IMS network, reducing loss of user service experience caused by introduction of the IMS network, and at the same time inheriting an existing device to a largest extent.

Embodiment 2

Figure 4:
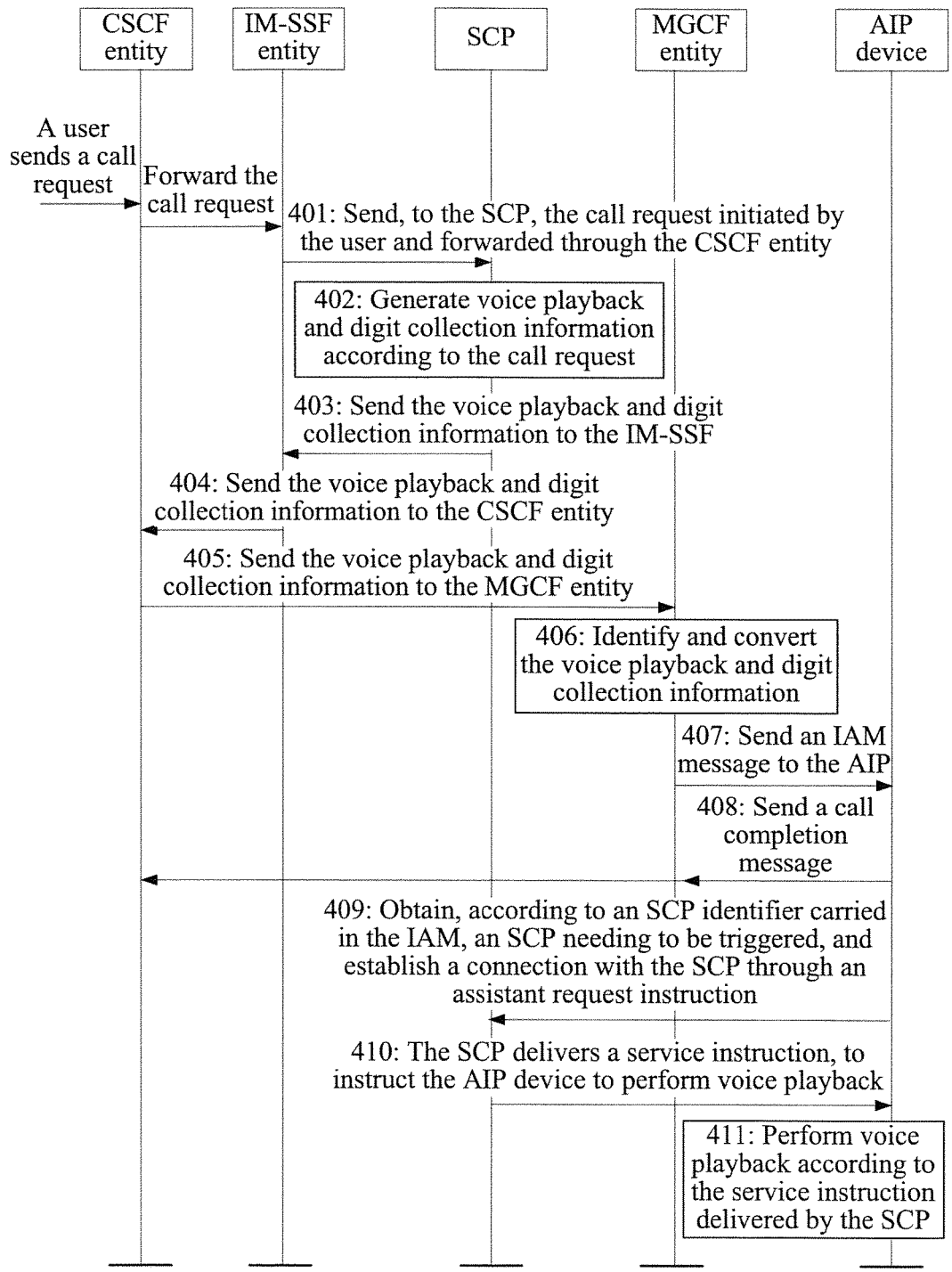
FIG. 4 is a flowchart of a method for implementing prompting and collecting user information according to Embodiment 2 of the present invention.

An embodiment of the present invention provides a method for implementing prompting and collecting user information. A manner of implementing prompting and collecting user information provided in the embodiment of the present invention is explained and described in detail with reference to content of Embodiment 1 and by using that a CSCF entity, an IM-SSF entity, an SCP, an MGCF entity, and an AIP device exist in a prompting and collecting user information system as an example. Referring to FIG. 4, a procedure of the method provided in this embodiment includes:

Step 401: An IM-SSF entity sends, to an SCP, a call request initiated by a user and forwarded through a CSCF entity.

The call request initiated by the user specifically is a request initiated by the user through a mobile terminal or a fixed terminal of the user to another user or a service operator. For example, dial a phone number of another user or dial a hotline number of the service operator.

After the user initiates the call request, the call request is first received by the CSCF entity; after the CSCF entity receives the call request, the CSCF entity forwards the call request to the IM-SSF entity through an ISC (Intel Server Controller, Intel server controller) standard interface; and after the IM-SSF entity receives the call request, the IM-SSF entity sends the call request to the SCP through a CAP/INAP interface between the IM-SSF entity and the SCP.

Step 402: The SCP generates prompting and collecting user information information according to the received call request, where the prompting and collecting user information information includes a routing address of an AIP device, an identifier ID of the SCP, and a service correlation ID.

The routing address of the AIP device is used to identify an address of the AIP device; the service correlation ID is used to identify a service type corresponding to the call request of the user, such as, a ringback tone service or a user hotline service; the identifier ID of the SCP is used to identify which SCP delivers the prompting and collecting user information information, so that after receiving the prompting and collecting user information information, the AIP device establishes a corresponding connection with the SCP delivering the prompting and collecting user information information.

Moreover, in addition to the foregoing three types of information, the prompting and collecting user information information may also carry other information, for example, information about time of generating the prompting and collecting user information information. This embodiment does not specifically limit content included in the prompting and collecting user information information.

Step 403: The SCP delivers the prompting and collecting user information information to the IM-SSF entity.

For this step, the SCP and the IM-SSF entity are interconnected by using a CAP (Customized Applications for Mobile network Enhanced Logic Application Part, customized applications for mobile network enhanced logic application part)/INAP (Intelligent Network Application Protocol, intelligent network application protocol) interface, and the CAP/INAP interface is extended to support an ETC operation and a parameter in the CS (Circuit Switched, circuit switched) standard, and therefore the SCP may deliver the prompting and collecting user information information to the IM-SSF entity through the CAP/INAP interface.

Step 404: The IM-SSF entity receives the prompting and collecting user information information delivered by the SCP, and forwards the prompting and collecting user information information to the CSCF entity.

For this step, the IM-SSF entity receives, through the CAP/INAP interface, the prompting and collecting user information information delivered by the SCP, where a specific implementation manner for the IM-SSF entity to forward the prompting and collecting user information information to the CSCF entity includes but is not limited to the following two manners:

Manner 1: Extend the ISC interface, carry the prompting and collecting user information information in the ISC interface, and forward the prompting and collecting user information information carried on the ISC interface to the CSCF entity.

An example of extension of the ISC interface is as follows:
INVITE tel:+8613734567890;Correlation-id=222222; Scf-id=888888 SIP/2.0
Via: SIP/2.0/UDP 172.22.131.124:11188;
Call-ID: 16670405@172.22.131.209
From: <tel:+8613734568888>;tag=16670404
To: <tel:+8613734567890>;tag=16670adasdf
P-Asserted-Identity: "Cullen Jennings"<tel:818 008613734568888>
where Correlation-id=222222;Scf-id=888888 is the extended ISC interface, Correlation-id refers to the service correlation ID, Scf-id refers to the identifier ID of the SCP, that is, two parameters, Correlation-id and Scf-id, are extended in a uniform resource locator request (Request URI), so as to achieve an objective of carrying the service correlation ID and the SCP identifier; in addition, when the routing address of the AIP device is carried to the CSCF entity, the CSCF entity converts the routing address of the AIP device into Request URI content in the ISC interface, and replaces the original Request URI content with the routing address of the AIP device.

Manner 2: Combine and carry the routing address of the AIP device, the service correlation ID and the identifier ID of the SCP in the Request URI according to a configuration rule.

An example of carrying is as follows:
INVITE tel:+86137345678902222222888888 SIP/2.0
Via: SIP/2.0/UDP 172.22.131.124:11188;
Call-ID: 16670405@172.22.131.209
From: <tel:+8613734568888>;tag=16670404
To: <tel:+8613734567890>;tag=16670adasdf
P-Asserted-Identity: "Cullen Jennings"<tel:818 008613734568888>
where 222222 is the Correlation ID (service correlation ID), and 888888 is the Scf-id (identifier ID of the SCP).

Step 405: The CSCF entity sends the received prompting and collecting user information information to the MGCF entity.

When sending the prompting and collecting user information information to the MGCF entity, the CSCF entity implements transferring of the prompting and collecting user information information by using an Mg interface between the CSCF entity and the MGCF entity.

Step 406: The MGCF receives the prompting and collecting user information information sent by the CSCF entity, and identifies and converts information included in the prompting and collecting user information information.

For this step, the MGCF entity identifies and converts the information included in the prompting and collecting user information information mainly in the following two manners:

Manner 1: If the service correlation ID and the SCP identifier exist in the Mg interface between the CSCF entity and the MGCF entity, directly convert the service correlation ID and the SCP identifier into a service correlation ID format and an identifier ID of the SCP format that are supported in a standard ISUP (Integrated Services Digital Network_User Part, integrated services digital network_user part) interface.

Manner 2: If the service correlation ID and the identifier ID of the SCP do not exist in the Mg interface between the CSCF entity and the MGCF entity, a rule may be configured according to a prefix of the Request URI: respectively obtaining several digits from the Request URI as the service correlation ID and the identifier ID of the SCP in the standard ISUP interface.

For this manner, when the method provided in this embodiment is executed, it may be defined in advance that how many digits in the Request URI represent the service correlation ID, and how many other digits in the Request URI represent the identifier ID of the SCP. For example, it may be defined in advance that the 15th digit to the 20th digit in the Request URI are the service correlation ID, and the 21st digit to the 26th digit are the identifier ID of the SCP. Certainly, in addition to the foregoing definition, the setting may also be made according to a requirement, and this embodiment does not specifically limit which setting manner is specifically adopted.

Step 407: The MGCF entity sends the prompting and collecting user information information to the AIP through the ISUP interface according to the routing address of the AIP device.

A specific implementation manner in which the MGCF entity sends the prompting and collecting user information information to the AIP through the ISUP interface according to the routing address of the AIP device includes but is not limited to:

first carrying the prompting and collecting user information information in an IAM, and then transferring the prompting and collecting user information information to the AIP through the ISUP interface according to the routing address of the AIP device in the prompting and collecting user information information.

Step 408: The AIP device replies with a call completion message according to the received prompting and collecting user information information.

For this step, after the AIP receives the prompting and collecting user information information generated by the SCP, in order to feed back a receiving status of the AIP to the user, the AIP replies to the user with a call completion message. After the call completion message is generated, the call completion message is first transferred to the MGCF entity through the ISUP interface; after the MGCF entity receives the call completion message, the MGCF entity forwards the call completion message to the CSCF entity through the Mg interface, and the CSCF entity may directly feed back the call completion message to the user after receiving the call completion message. In addition, to implement an entire interaction process to achieve an objective that information of two interacting parties is transparent, the method provided in this embodiment further supports a process where after receiving the call completion message, the user returns a reply message to the MGCF entity through the CSCF entity.

Step 409: The AIP device obtains, according to the identifier ID of the SCP carried in the IAM, an SCP needing to be triggered, and establishes a connection with the SCP through an assistant request instruction, where the assistant request instruction carries the service correlation ID.

For this step, because multiple SCPs exist in the IMS network architecture, in order to identify which SCP delivers the prompting and collecting user information information to the AIP device and facilitate receiving of a prompting and collecting user information instruction of the SCP subsequently, in the method provided in this embodiment, after receiving the prompting and collecting user information information generated by the SCP, the AIP device determines the SCP sending the prompting and collecting user information information and establishes a connection with the SCP by sending the assistant request instruction to the SCP. To facilitate that the SCP learns which type of service instruction the SCP needs to specifically deliver subsequently, the assistant request instruction further includes the service correlation ID. Certainly, in addition to the service correlation ID, the assistant request instruction may also include other information, such as time of generating the assistant request instruction, which is not specifically limited in this embodiment.

Step 410: The SCP delivers a service instruction, to instruct the AIP device to perform voice playback.

The service instruction includes a voice playback instruction, and a prompting and collecting user information instruction; the voice playback instruction only instructs the AIP device to play voice content corresponding to the service correlation ID, for example, play a ringback tone of another user whom the user dials; the prompting and collecting user information instruction instructs the AIP device to not only play voice content corresponding to the service correlation ID to the user, but also receive a key code input by the user and further play voice content corresponding to the key code to the user according to the key code input by the user, for example, voice content played by the service operator to the user when the user dials a hotline number of the service operator.

Step 411: The AIP device performs voice playback according to the service instruction delivered by the SCP.

For this step, because all voice content is stored in the AIP device, after receiving the service instruction delivered by the SCP, the AIP device may directly perform voice playback according to the service content included in the service instruction. If the service instruction includes the voice playback instruction, the AIP device only performs a voice playback operation; if the service instruction includes the prompting and collecting user information instruction, the AIP device not only performs a voice playback operation, but also performs a digit collection operation.

In addition, after the AIP device completes voice playback, in order that the SCP can determine whether the AIP device succeeds in completing voice playback work corresponding to the service instruction delivered by the SCP, the method provided in this embodiment also supports a step that the AIP device reports a voice playback result to the SCP. A specific implementation manner in which the AIP device reports the voice playback result to the SCP may be implemented based on an existing reporting mechanism, for example, the AIP device reports a dedicated resource report to the SCP, which is not specifically limited in this embodiment.

It should be noted that, through step 401 to step 411, prompting and collecting user information of an intelligent service may be implemented. Further, if the SCP determines, according to the service logic, that the prompting and collecting user information function is completed currently, for the purpose of saving resources, the method provided in this embodiment further includes a step of disconnecting the SCP and the AIP device. A specific process of disconnecting the SCP and the AIP device is as follows:

The SCP first delivers a disconnect forward connection instruction to the IM-SSF entity, and after the IM-SSF entity receives the disconnect forward connection instruction delivered by the SCP, the IM-SSF entity delivers a Bye message to the MGCF entity through the CSCF entity according to the instruction; after the MGCF entity receives the Bye message, the MGCF entity sends a release message to the AIP device; the AIP device releases the AIP device and releases the current call according to the release message, and automatically sends a call release completion message to the MGCF entity after completing the release. After receiving the release completion message returned by the AIP device, the MGCF entity returns 200, and the AIP device disconnects the SCP. Then the SCP determines, according to the current service logic, that the current service processing is complete, and delivers an instruction for releasing the current call to the IM-SSF entity. Finally the IM-SSF entity sends the Bye information to the user through the CSCF entity to release the call.

In the method provided in this embodiment, the IMS network side entity sends the ETC operation information carrying the prompting and collecting user information information to the AIP device, so that the AIP device establishes the connection with the SCP according to the ETC operation information, and then interacts with the SCP through the connection, thereby completing the prompting and collecting user information process, implementing that the AIP device is supported to complete the prompting and collecting user information function in the IMS network, reducing loss of user service experience caused by introduction of the IMS network, and at the same time inheriting an existing device to a largest extent.

Embodiment 3

Figure 5:
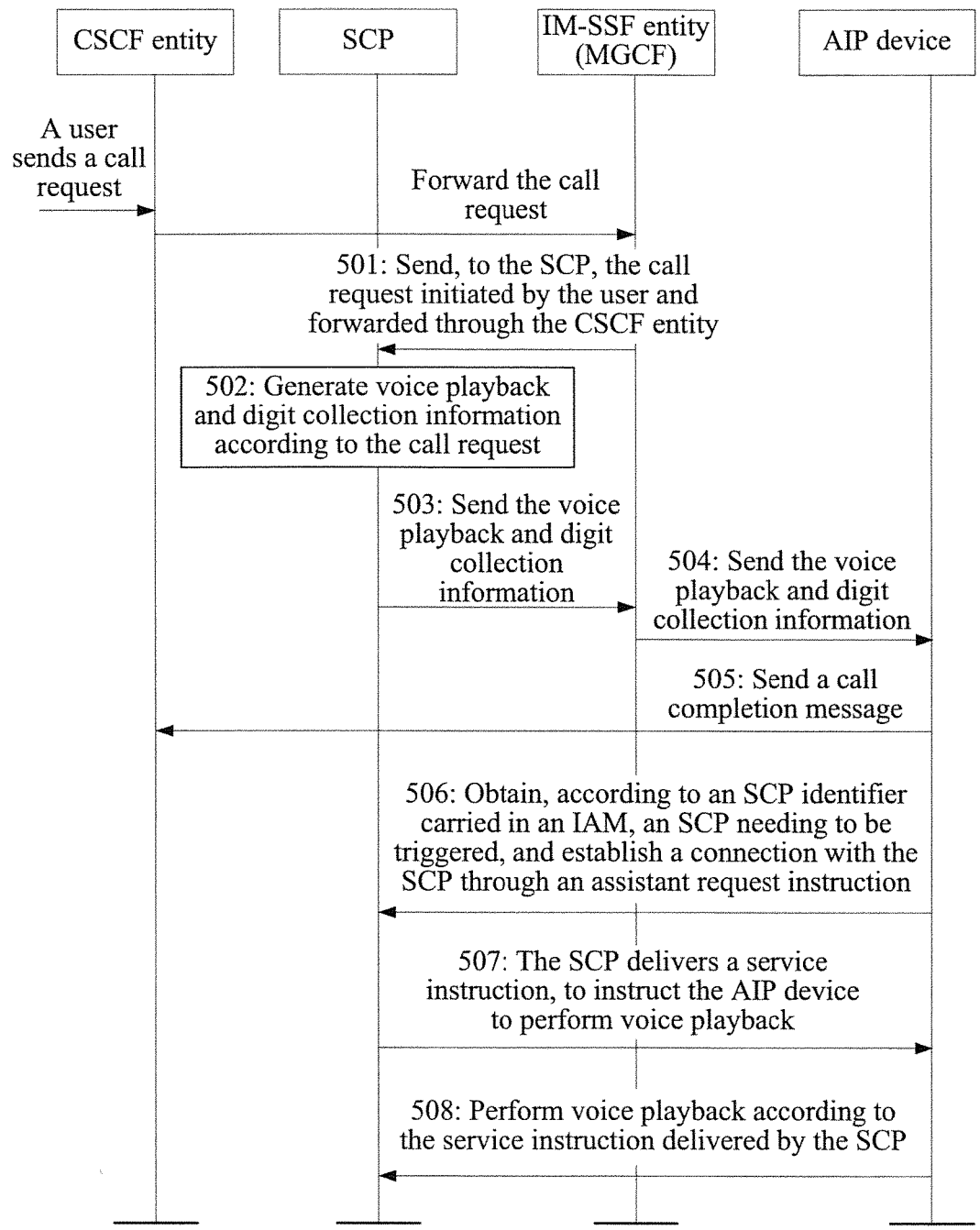
FIG. 5 is a flowchart of a method for implementing prompting and collecting user information according to Embodiment 3 of the present invention.

An embodiment of the present invention provides a method for implementing prompting and collecting user information. A manner of implementing prompting and collecting user information provided in the embodiment of the present invention is explained and described in detail with reference to content of Embodiment 1 and by using that four devices: a CSCF entity, an SCP, an MGCF entity, and an AIP exist in a prompting and collecting user information system, and the MGCF may implement the function of the IM-SSF entity in Embodiment 2 as an example. Referring to FIG. 5, a procedure of the method provided in this embodiment includes:

Step 501: An IM-SSF entity sends, to an SCP, a call request initiated by a user and forwarded through a CSCF entity.

The call request initiated by the user specifically is a request initiated by the user through a mobile terminal or a fixed terminal of the user to another user or a service operator. For example, dial a phone number of another user or dial a hotline number of the service operator.

After the user initiates the call request, the call request is first received by the CSCF entity; after the CSCF entity receives the call request, the CSCF entity forwards the call request to the MGCF entity; and after the MGCF entity receives the call request, the MGCF entity directly sends the call request to the SCP.

Step 502: The SCP generates prompting and collecting user information information according to the received call request, where the prompting and collecting user information information includes a routing address of an AIP device, a service correlation ID, and an identifier ID of the SCP.

The routing address of the AIP device is used to identify an address of the AIP device; the service correlation ID is used to identify a service type corresponding to the call request of the user, such as, a ringback tone service or a user hotline service; the identifier ID of the SCP is used to identify which SCP delivers the prompting and collecting user information information, so that after receiving the prompting and collecting user information information, the AIP establishes a corresponding connection with the SCP delivering the prompting and collecting user information information.

Moreover, in addition to the foregoing three types of information, the prompting and collecting user information information may also carry other information, for example, information about time of generating the prompting and collecting user information information. This embodiment does not specifically limit content included in the prompting and collecting user information information.

Step 503: The SCP delivers the prompting and collecting user information information to the IM-SSF entity.

Step 504: The IM-SSF entity sends the prompting and collecting user information information to the AIP device through the ISUP interface according to the routing address of the AIP device.

A specific implementation manner in which the MGCF entity sends the prompting and collecting user information information to the AIP through the ISUP interface according to the routing address of the AIP device includes but is not limited to:

first carrying the prompting and collecting user information information in an IAM, and then transferring the prompting and collecting user information information to the AIP device through the ISUP interface according to the routing address of the AIP device.

Step 505: The AIP device replies with a call completion message according to the received prompting and collecting user information information.

For this step, after the AIP device receives the prompting and collecting user information information generated by the SCP, in order to feed back a receiving status of the AIP device to the user, the AIP device replies to the user with a call completion message. After the call completion message is generated, the call completion message is first transferred to the MGCF entity through the ISUP interface; then after the MGCF entity receives the call completion message, the MGCF entity forwards the call completion message to the CSCF entity through the Mg interface; after the CSCF entity receives the call completion message, the CSCF entity may directly feed back the call completion message to the user. In addition, to implement an entire interaction process to achieve an objective that information of two interacting parties is transparent, the method provided in this embodiment further supports a step where after receiving the call completion message, the user returns a reply message to the MGCF entity through the CSCF entity.

Step 506: The AIP device obtains, according to the identifier ID of the SCP carried in the IAM, an SCP needing to be triggered, and establishes a connection with the SCP through an assistant request instruction, where the assistant request instruction carries the service correlation ID.

For this step, because multiple SCPs exist in the IMS network architecture, in order to identify which SCP delivers the prompting and collecting user information information to the AIP device and facilitate receiving of a prompting and collecting user information instruction of the SCP subsequently, in the method provided in this embodiment, after receiving the prompting and collecting user information information generated by the SCP, the AIP device determines the SCP sending the prompting and collecting user information information and establishes a connection with the SCP by sending the assistant request instruction to the SCP. To facilitate that the SCP learns which type of service instruction the SCP needs to specifically deliver subsequently, the assistant request instruction further includes the service correlation ID. Certainly, in addition to the service correlation ID, the assistant request instruction may also include other information, such as time of generating the assistant request instruction, which is not specifically limited in this embodiment.

Step 507: The SCP delivers a service instruction, to instruct the AIP device to perform voice playback.

The service instruction includes a voice playback instruction, and a prompting and collecting user information instruction; the voice playback instruction only instructs the AIP device to play voice content corresponding to the service correlation ID, for example, play a ringback tone of another user whom the user dials; the prompting and collecting user information instruction instructs the AIP device to not only play voice content corresponding to the service correlation ID to the user, but also receive a key code input by the user and further play voice content corresponding to the key code to the user according to the key code input by the user, for example, voice content played by the service operator to the user when the user dials a hotline number of the service operator. Specifically, whether the SCP delivers a voice playback instruction or a prompting and collecting user information instruction may be determined according to a specific service scenario.

Step 508: The AIP device performs voice playback according to the service instruction delivered by the SCP.

For this step, because all voice content is stored in the AIP device, after receiving the service instruction delivered by the SCP, the AIP device may directly perform voice playback according to the service content included in the service instruction. If the service instruction includes the voice playback instruction, the AIP device only performs a voice playback operation; if the service instruction includes the prompting and collecting user information instruction, the AIP device not only performs a voice playback operation, but also performs a digit collection operation. After the AIP device completes voice playback, in order that the SCP can determine whether the AIP device succeeds in completing voice playback work corresponding to the service instruction delivered by the SCP, the method provided in this embodiment also supports a step of reporting a voice playback result to the SCP. A specific implementation manner in which the AIP device reports the voice playback result to the SCP may be implemented based on an existing reporting mechanism, for example, report a dedicated resource report to the SCP, which is not specifically limited in this embodiment.

It should be noted that, through step 501 to step 508, prompting and collecting user information of an intelligent service may be implemented. Further, if the SCP determines, according to the service logic, that the prompting and collecting user information function is completed currently, for the purpose of saving resources, the method provided in this embodiment further includes a step of disconnecting the SCP and the AIP device. A specific process of disconnecting the SCP and the AIP device is as follows:

The SCP first delivers a disconnect forward connection instruction to the MGCF entity, and after the MGCF entity receives the disconnect forward connection instruction delivered by the SCP, the MGCF entity sends a release message to the AIP device. The AIP device releases the AIP device and releases the current call according to the release message, automatically sends a call release completion message to the MGCF entity after completing the release, and disconnects the SCP. Then, the SCP determines, according to the current service logic, that the current service processing is completed, and delivers an instruction for releasing the current call to the MGCF entity. Finally, the MGCF entity sends Bye information to the user through the CSCF entity to release the call.

In the method provided in this embodiment, the IMS network side entity sends the ETC operation information carrying the prompting and collecting user information information to the AIP device, so that the AIP device establishes the connection with the SCP according to the ETC operation information, and then interacts with the SCP through the connection, thereby completing the prompting and collecting user information process, implementing that the AIP device is supported to complete the prompting and collecting user information function in the INS network, reducing loss of user service experience caused by introduction of the INS network, and at the same time inheriting an existing device to a largest extent.

Embodiment 4

Figure 6:
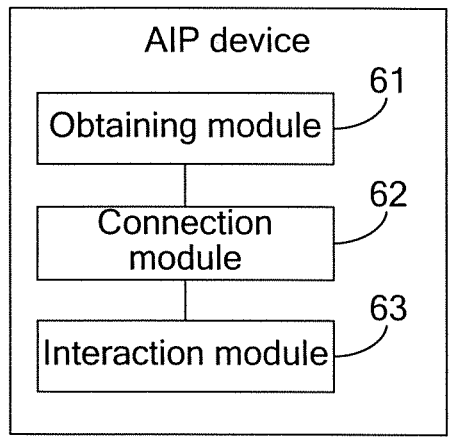
FIG. 6 is a schematic structural diagram of an AIP device according to Embodiment 4 of the present invention.

This embodiment provides an AIP device. The AIP device pre-stores a voice required by a prompting and collecting user information function, and the AIP device is connected to an INS network through an INS network side entity. Referring to FIG. 6, the AIP device includes:

an obtaining module 61, configured to obtain establish temporary connection ETC operation information forwarded by the INS network side entity and carrying prompting and collecting user information information, where the ETC operation information is sent by a service control point SCP, and the prompting and collecting user information information includes a routing address of the AIP device, an identifier ID of the SCP, and a service correlation ID;

a connection module 62, configured to establish a connection with the SCP through the INS network side entity according to the prompting and collecting user information information carried in the ETC operation information; and an interaction module 63, configured to interact with the SCP according to the established connection, so as to complete a prompting and collecting user information process.

Preferably, the IMS network side entity is an MGCF entity, and the MGCF entity is connected to the SCP through a CSCF entity and an IM-SSF entity.

The obtaining module 61 includes:

a first obtaining unit, configured to obtain the ETC operation information forwarded by the MGCF entity and carrying the prompting and collecting user information information, where the ETC operation information is sent by the IM-SSF entity to the MGCF entity through the CSCF entity after being sent by the SCP to the IM-SSF entity.

Further, an interface between the IM-SSF entity and the SCP is extended to support an ETC operation. The IM-SSF entity sends the ETC operation information to the CSCF entity by extending the interface between the IM-SSF entity and the CSCF entity, or sends the ETC operation information to the CSCF entity in a manner of combining the ETC operation information with a request uniform resource identifier according to a preset rule, and the CSCF entity sends the ETC operation information to the MGCF entity; and the first obtaining unit is configured to receive an initial address message IAM sent by the MGCF entity and carrying the ETC operation information, so that the AIP device obtains the ETC operation information from the IAM.

Alternatively, the IMS network side entity is an IM-SSF entity, and the IM-SSF entity is connected to the SCP.

The obtaining module 61 includes:

a second obtaining unit, configured to obtain the ETC operation information forwarded by the IM-SSF entity and carrying the prompting and collecting user information information, where the ETC operation information is sent by the SCP to the IM-SSF entity.

Further, an interface between the IM-SSF entity and the SCP is extended to support the ETC operation; and the second obtaining unit is configured to receive an initial address message IAM sent by the IM-SSF entity and carrying the ETC operation information, so that the AIP device obtains the ETC operation information from the IAM message.

Further, the interaction module 63 is configured to receive a voice playback request delivered by the SCP and carrying voice playback content, and perform a voice playback operation according to the voice playback request; and/or, receive a prompting and collecting user information instruction delivered by the SCP, and perform a prompting and collecting user information operation according to the prompting and collecting user information request.

Further, the AIP device further includes: a receiving module, configured to receive a release message REL sent by the IMS network side entity;

a releasing module, configured to release a resource and disconnect from the SCP according to the REL; and a returning module, configured to return a resource release completion message to the IMS network side entity, so that the IMS network side entity returns the resource release completion message to the SCP, where the REL is sent after the IMS network side entity receives a disconnect forward connection DFC instruction delivered by the SCP.

The device provided in this embodiment receives the ETC operation information forwarded by the IMS network side entity and carrying the prompting and collecting user information information, then establishes the connection with the SCP according to the ETC operation information, and interacts with the SCP through the connection, thereby completing the prompting and collecting user information process, implementing that the AIP device is supported to complete the prompting and collecting user information function in the IMS network, reducing loss of user service experience caused by introduction of the IMS network, and at the same time inheriting an existing device to a largest extent.

Embodiment 5

Figure 7:
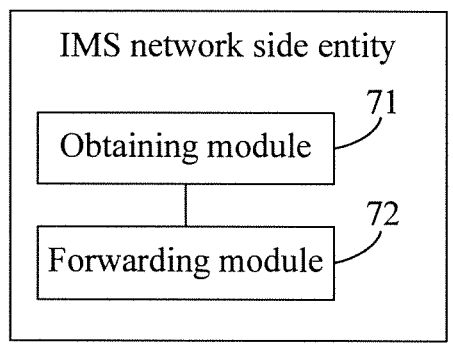
FIG. 7 is a schematic structural diagram of an IMS network side entity according to Embodiment 5 of the present invention.

This embodiment provides an IMS network side entity. An AIP device pre-stores a voice required by a prompting and collecting user information function, and the AIP device is connected to an IMS network through the IMS network side entity. Referring to FIG. 7, the IMS network side entity includes:

an obtaining module 71, configured to obtain ETC operation information sent by a service control point SCP and carrying prompting and collecting user information information, where the prompting and collecting user information information includes a routing address of the AIP device, an identifier ID of the SCP, and a service correlation ID; and a forwarding module 72, configured to forward the ETC operation information to the AIP device, so that the AIP device establishes a connection with the SCP according to the prompting and collecting user information information carried in the ETC operation information, and interacts with the SCP according to the established connection, so as to complete a prompting and collecting user information process.

Preferably, the IMS network side entity is a media gateway control function MGCF entity, and the MGCF entity is connected to the SCP through the call CSCF entity and the IM-SSF entity.

The obtaining module 71 includes:

a first obtaining unit, configured to obtain the ETC operation information forwarded by the IM-SSF entity through the CSCF entity and carrying the prompting and collecting user information information, where the ETC operation information is sent by the SCP to the IM-SSF entity.

Further, an interface between the IM-SSF entity and the SCP is extended to support an ETC operation. The IM-SSF entity sends the ETC operation information to the CSCF entity by extending the interface between the IM-SSF entity and the CSCF entity, or sends the ETC operation information to the CSCF entity in a manner of combining the ETC operation information with a request uniform resource identifier according to a preset rule, and the CSCF entity sends the ETC operation information to the MGCF entity.

The forwarding module 72 includes:

a first sending unit, configured to send an initial address message IAM carrying the ETC operation information to the AIP device, so that the AIP device obtains the ETC operation information from the IAM.

Alternatively, the IMS network side entity is an IM-SSF entity, and the IM-SSF entity is connected to the SCP.

The obtaining module 71 includes:

a second obtaining unit, configured to obtain ETC operation information sent by the service control point SCP and carrying the prompting and collecting user information information.

Further, an interface between the IM-SSF entity and the SCP is extended to support the ETC operation; and the forwarding module 72 includes:

a second sending unit, configured to send an initial address message IAM carrying the ETC operation information to the AIP device, so that the AIP device obtains the ETC operation information from the IAM.

Further, the IMS network side entity further includes:

a first receiving module, configured to receive a disconnect forward connection DFC instruction delivered by the SCP;

a sending module, configured to send a release message REL to the AIP device according to the DFC instruction, so that the AIP device releases a resource and disconnects the SCP according to the REL;

a second receiving module, configured to receive a resource release completion message returned by the AIP device; and a returning module, configured to return the resource release completion message to the SCP.

The entity provided in this embodiment sends the ETC operation information carrying the prompting and collecting user information information to the AIP device, so that the AIP device establishes the connection with the SCP according to the ETC operation information, and then interacts with the SCP through the connection, thereby completing the prompting and collecting user information process, implementing that the AIP device is supported to complete the prompting and collecting user information function in the IMS network, reducing loss of user service experience caused by introduction of the IMS network, and at the same time inheriting an existing device to a largest extent.

Embodiment 6

Figure 8:
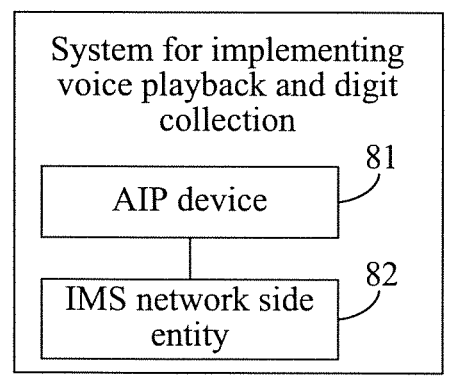
FIG. 8 is a schematic structural diagram of a system for implementing prompting and collecting user information according to Embodiment 6 of the present invention.

This embodiment provides a system for implementing prompting and collecting user information. Referring to FIG. 8, the system includes: an AIP device 81 and an IMS network side entity 82.

The AIP device 81 is the device provided in Embodiment 4, and for details, reference is made to content in Embodiment 4, which is not repeatedly described herein.

The IMS network side entity 82 is the entity provided in Embodiment 5, and for details, reference is made to content in Embodiment 5, which is not repeatedly described herein.

In the system provided in this embodiment, the IMS network side entity sends ETC operation information carrying prompting and collecting user information information to the AIP device, so that the AIP device establishes a connection with the SCP according to the ETC operation information, and then interacts with the SCP through the connection, thereby completing a prompting and collecting user information process, implementing that the AIP device is supported to complete a prompting and collecting user information function in an IMS network, reducing loss of user service experience caused by introduction of the IMS network, and at the same time inheriting an existing device to a largest extent.

Embodiment 7

Figure 9:
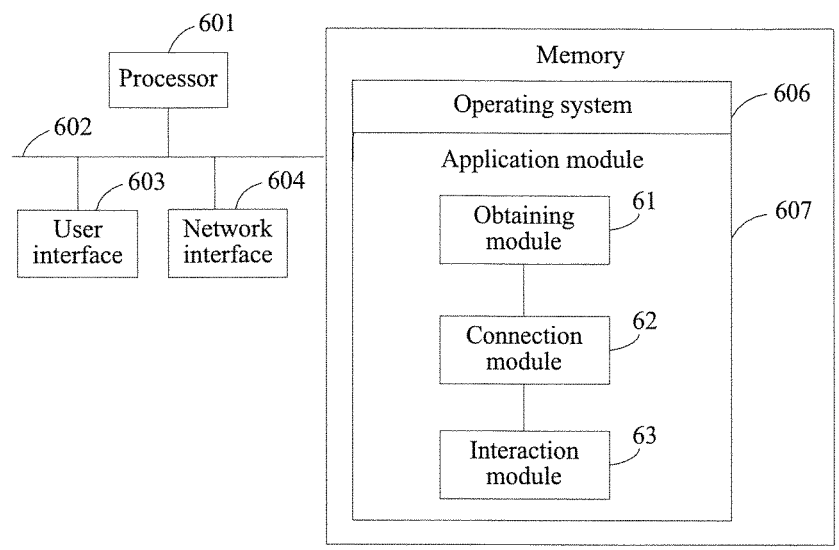
FIG. 9 is a schematic diagram of an internal structure of an AIP device according to Embodiment 7 of the present invention.

FIG. 9 is a schematic structural diagram of an AIP device in an implementation manner. The AIP device includes at least one processor (601), for example, a CPU, at least one network interface 604, or another user interface 603, a memory 605, and at least one communication bus 602. The communication bus 602 is configured to implement connection communication between these apparatuses. The user interface 603 may be a display, a keyboard, or a clicking device. The memory 605 may include a high-speed RAM memory, and may also include a non-volatile memory (non-volatile memory), for example, at least one disk memory. The memory 605 optionally may include at least one storage apparatus located far away from the foregoing CPU601.

The processor 601 is configured to execute a program stored in the memory 605, so as to implement the following method: obtaining ETC operation information forwarded by an IMS network side entity and carrying prompting and collecting user information information, where the ETC operation information is sent by an SCP, and the prompting and collecting user information information includes a routing address of an AIP device, an identifier ID of the SCP, and a service correlation ID; establishing a connection with the SCP through the INS network side entity according to the prompting and collecting user information information carried in the ETC operation information; and interacting with the SCP according to the established connection, so as to complete a prompting and collecting user information process.

Further, the processor 601 is specifically configured to obtain the ETC operation information forwarded by an MGCF entity and carrying the prompting and collecting user information information, where the ETC operation information is sent by an IM-SSF entity to the MGCF entity through a CSCF entity after being sent by the SCP to the IM-SSF entity.

Further, the processor 601 is specifically configured to receive an IAM sent by the MGCF entity and carrying the ETC operation information, and obtain the ETC operation information from the IAM.

Further, the processor 601 is specifically configured to obtain the ETC operation information forwarded by the IM-SSF entity and carrying the prompting and collecting user information information, where the ETC operation information is sent by the SCP to the IM-SSF entity.

Further, the processor 601 is specifically configured to receive an IAM sent by the IM-SSF entity and carrying the ETC operation information, and obtain the ETC operation information from the IAM message.

Further, the processor 601 is specifically configured to receive a voice playback request delivered by the SCP and carrying voice playback content, and perform a voice playback operation according to the voice playback request; and/or receive a prompting and collecting user information instruction delivered by the SCP, and perform a prompting and collecting user information operation according to the prompting and collecting user information request.

Further, the processor 601 is further configured to receive a REL sent by the IMS network side entity, release a resource and disconnect from the SCP according to the REL, and return a resource release completion message to the IMS network side entity, so that the IMS network side entity returns the resource release completion message to the SCP.

The REL is sent after the IMS network side entity receives a disconnect forward connection DFC instruction delivered by the SCP.

In some implementation manners, the memory 605 stores the following elements, modules, or data structures, or their subsets, or their extension sets:

an operating system 606, including various programs, and configured to implement various basic services and process a hardware-based task; and an application module 607, including an obtaining module 61, a connection module 62, and an interaction module 63. For functions of the foregoing modules, reference may be made to the description part of a working principle diagram of FIG. 4, which is not repeatedly described herein.

In the device provided in this embodiment, the IMS network side entity sends the ETC operation information carrying the prompting and collecting user information information to the AIP device, so that the AIP device establishes a connection with the SCP according to the ETC operation information, and then interacts with the SCP through the connection, thereby completing a prompting and collecting user information process, implementing that the AIP device is supported to complete the prompting and collecting user information function in the IMS network, reducing loss of user service experience caused by introduction of the IMS network, and at the same time inheriting an existing device to a largest extent.

Embodiment 8

Figure 10:
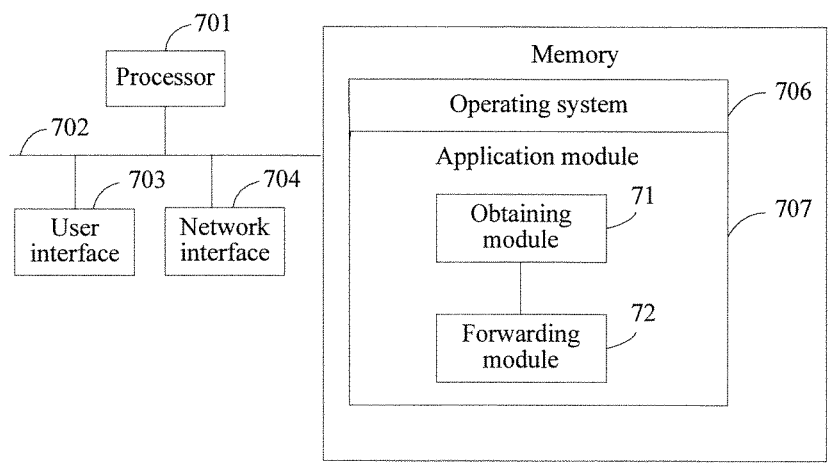
FIG. 10 is a schematic diagram of an internal structure of an IMS network side entity according to Embodiment 8 of the present invention.

FIG. 10 is a schematic structural diagram of an IMS network side entity in an implementation manner. The IMS network side entity includes at least one processor (701), for example, a CPU, at least one network interface 704, or another user interface 703, a memory 705, and at least one communication bus 702. The communication bus 702 is configured to implement connection communication between these apparatuses. The user interface 703 may be a display, a keyboard, or a clicking device. The memory 705 may include a high-speed Ram memory, and may also include a non-volatile memory (non-volatile memory), for example, at least one disk memory. The memory 705 optionally may include at least one storage apparatus located far away from the foregoing CPU 701.

The processor 701 is configured to execute a program stored in the memory 705, so as to implement the following method: obtaining ETC operation information sent by an SCP and carrying prompting and collecting user information information, where the prompting and collecting user information information includes a routing address of an AIP device, an identifier ID of the SCP, and a service correlation ID; and forwarding the ETC operation information to the AIP device, so that the AIP device establishes a connection with the SCP according to the prompting and collecting user information information carried in the ETC operation information, and interacts with the SCP according to the established connection, so as to complete a prompting and collecting user information process.

Further, the processor 701 is specifically configured to obtain the ETC operation information forwarded by an IM-SSF entity through a CSCF entity and carrying the prompting and collecting user information information, where the ETC operation information is sent by an SCP to the IM-SSF entity.

Further, the processor 701 is specifically configured to send an IAM carrying the ETC operation information to the AIP device, so that the AIP device obtains the ETC operation information from the IAM.

Further, the processor 701 is specifically configured to obtain the ETC operation information sent by the SCP and carrying the prompting and collecting user information information.

Further, the processor 701 is specifically configured to send an IAM carrying the ETC operation information to the AIP device, so that the AIP device obtains the ETC operation information from the IAM.

Further, the processor 701 is further configured to receive a DFC instruction delivered by the SCP, and send a REL to the AIP device according to the DFC instruction, so that the AIP device releases a resource and disconnects the SCP according to the REL;

receive a resource release completion message returned by the AIP device, and return the resource release completion message to the SCP. Further, the processor 701 is further configured to receive a release message REL sent by the IMS network side entity, release a resource and disconnect from the SCP according to the REL, and return a resource release completion message to the IMS network side entity, so that the IMS network side entity returns the resource release completion message to the SCP.

In some implementation manners, the memory 705 stores the following elements, modules, or data structures, or their subsets, or their extension sets:

an operating system 707, including various programs, and configured to implement various basic services and process a hardware-based task; and an application module 707, including an obtaining module 71 and a forwarding module 72. For functions of the foregoing modules, reference may be made to the description part of a working principle diagram of FIG. 5, which is not repeatedly described herein.

The entity provided in this embodiment sends the ETC operation information carrying the prompting and collecting user information information to the AIP device, so that the AIP device establishes the connection with the SCP according to the ETC operation information, and then interacts with the SCP through the connection, thereby completing a prompting and collecting user information process, implementing that the AIP device is supported to complete the prompting and collecting user information function in the IMS network, reducing loss of user service experience caused by introduction of the IMS network, and at the same time inheriting an existing device to a largest extent.

It should be noted that, the AIP device or the IMS network side entity provided in the foregoing embodiments, when implementing prompting and collecting user information, allocates the foregoing functions to different functional modules for implementation prompting and collecting user information, that is, divides an internal structure of the device into different functional modules, so as to implement all or a part of the foregoing functions. In addition, the AIP device, the IMS network side entity, and the system for implementing prompting and collecting user information provided in the foregoing embodiments belong to a conception same as that of the method embodiment for implementing prompting and collecting user information. For details about a specific implementation process thereof, reference is made to the method embodiment, which is not repeatedly described herein.

The sequence numbers of the foregoing embodiments of the present invention are merely for convenience of description, and do not imply preference among the embodiments.

A person of ordinary skill in the art may understand that all or a part of the steps of the embodiments may be implemented by hardware, and may also be implemented by a program instructing relevant hardware. The program may be stored in a computer readable storage medium. The foregoing storage medium may be a read-only memory, a magnetic disk, or an optical disc.

The foregoing descriptions are merely exemplary embodiments of the present invention, but are not intended to limit the present invention. Any modification, equivalent replacement, improvement, or the like made without departing from the principle of the present invention should fall within the protection scope of the present invention.

What is claimed is:

1. A method for prompting and collecting user information, wherein an advanced intelligent peripheral (AIP) device pre-stores a voice required by a user-information-collection function, and the AIP device is connected to an Internet Protocol Multimedia Subsystem (IMS) network through an IMS network-side entity, the method comprising:

obtaining, by the AIP device, ETC (establish temporary connection) operation information forwarded by the IMS network-side entity and carrying user-prompting information, wherein the ETC operation information is sent by a service control point (SCP), and the user-prompting information comprises a routing address of the AIP device, an identifier (ID) of the SCP, and a service correlation ID;

establishing, by the AIP device, a connection with the SCP through the IMS network-side entity according to the user-prompting information carried in the ETC operation information; and interacting, by the AIP device, with the SCP according to the established connection, to collect user information.

2. The method according to claim 1, wherein:

the IMS network-side entity is a media gateway control function (MGCF) entity connected to the SCP through a call session control function (CSCF) entity and an Internet Protocol IP Multimedia Service Switch Function (IM-SSF) entity; and obtaining, by the AIP device, ETC operation information sent by the IMS network-side entity and carrying user-prompting information comprises:

obtaining, by the AIP device, the ETC operation information forwarded by the MGCF entity and carrying the user-prompting information, wherein the ETC operation information is sent by the IM-SSF entity to the MGCF entity through the CSCF entity after being sent by the SCP to the IM-SSF entity.

3. The method according to claim 2, wherein:

an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and obtaining, by the AIP device, the ETC operation information forwarded by the MGCF entity and carrying the user-prompting information comprises:

receiving, by the AIP device, an initial address message IAM sent by the MGCF entity and carrying the ETC operation information, so that the AIP device obtains the ETC operation information from the IAM.

4. The method according to claim 1, wherein:

the IMS network-side entity is an Internet Protocol IP Multimedia Service Switch Function (IM-SSF) entity connected to the SCP; and obtaining, by the AIP device, ETC operation information sent by the IMS network-side entity and carrying user-prompting information comprises:

obtaining, by the AIP device, the ETC operation information forwarded by the IM-SSF entity and carrying the user-prompting information, wherein the ETC operation information is sent by the SCP to the IM-SSF entity.

5. The method according to claim 4, wherein:

an interface between the IM-SSF entity and the SCP is extended to support an ETC operation; and obtaining, by the AIP device, the ETC operation information forwarded by the IM-SSF entity and carrying the user-prompting information comprises:

receiving, by the AIP device, an initial address message IAM sent by the IM-SSF entity and carrying the ETC operation information, so that the AIP device obtains the ETC operation information from the IAM message.

6. The method according to claim 1, wherein interacting, by the AIP device, with the SCP according to the established connection, to collect user information comprises:

receiving, by the AIP device, a voice playback request delivered by the SCP and carrying voice playback content, and performing a voice playback operation according to the voice playback request; and/or receiving, by the AIP device, a user-information-collection instruction delivered by the SCP, and performing a user-information-collection operation according to the user-information-collection instruction.

7. The method according to claim 1, wherein after interacting, by the AIP device, with the SCP according to the established connection, to collect user information, the method further comprises:

receiving, by the AIP device, a release message (REL) sent by the IMS network-side entity, releasing a resource and disconnecting from the SCP according to the REL, and returning a resource release completion message to the IMS network-side entity, so that the IMS network-side entity returns the resource release completion message to the SCP, wherein the REL is sent after the IMS network-side entity receives a disconnect forward connection (DFC) instruction delivered by the SCP.

8. An advanced intelligent peripheral (AIP) device, wherein the AIP device comprises a pre-stored voice required by a user-information-collection function, and the AIP device is connected to an Internet Protocol Multimedia Subsystem (IMS) network through an IMS network-side entity, the AIP device comprising:

a memory; and a processor in communication with the memory, wherein the processor is configured to:

obtain ETC (establish temporary connection) operation information forwarded by the IMS network-side entity and carrying user-prompting information, wherein the ETC operation information is sent by a service control point (SCP), and the user-prompting information comprises a routing address of the AIP device, an identifier (ID) of the SCP, and a service correlation ID;

establish a connection with the SCP through the IMS network-side entity according to the user-prompting information carried in the ETC operation information; and interact with the SCP according to the established connection, and to collect user information.

9. The device according to claim 8, wherein:

the IMS network-side entity is a media gateway control function (MGCF) entity connected to the SCP through a call session control function (CSCF) entity and an Internet Protocol IP Multimedia Service Switch Function (IM-SSF) entity; and the processor is further configured to:

obtain the ETC operation information forwarded by the MGCF entity and carrying the user-prompting information, wherein the ETC operation information is sent by the IM-SSF entity to the MGCF entity through the CSCF entity after being sent by the SCP to the IM-SSF entity.

10. The device according to claim 9, wherein:

an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a preset rule, and then the CSCF entity sends the ETC operation information to the MGCF entity; and the processor is further configured to receive an initial address message (IAM) sent by the MGCF entity and carrying the ETC operation information, so that the AIP device obtains the ETC operation information from the IAM.

11. The device according to claim 8, wherein:

the IMS network-side entity is an Internet Protocol IP Multimedia Service Switch Function (IM-SSF) entity connected to the SCP; and the processor is further configured to:

obtain the ETC operation information forwarded by the IM-SSF entity and carrying the user-prompting information, wherein the ETC operation information is sent by the SCP to the IM-SSF entity.

12. The device according to claim 11, wherein:

an interface between the IM-SSF entity and the SCP is extended to support an ETC operation; and the processor is further configured to receive an initial address message (IAM) sent by the IM-SSF entity and carrying the ETC operation information, so that the AIP device obtains the ETC operation information from the IAM message.

13. The device according to claim 8, wherein the processor is further configured to:

receive a voice playback request delivered by the SCP and carrying voice playback content, and perform a voice playback operation according to the voice playback request; and/or receive a user-information-collection instruction delivered by the SCP, and prompt and collect user information according to the request user-information-collection instruction.

14. The device according to claim 8, wherein the processor is further configured to:

receive a release message (REL) sent by the IMS network-side entity;

release a resource and disconnect from the SCP according to the REL; and return a resource release completion message to the IMS network-side entity, so that the IMS network-side entity returns the resource release completion message to the SCP, wherein the REL is sent after the IMS network-side entity receives a disconnect forward connection (DFC) instruction delivered by the SCP.

15. A method for prompting and collecting user information, wherein an advanced intelligent peripheral (AIP) device pre-stores a voice required by a user-information-collection function, and the AIP device is connected to an Internet Protocol Multimedia Subsystem (IMS) network through an IMS network-side entity, the method comprising:

obtaining, by the IMS network-side entity, ETC (establish temporary connection) operation information sent by a service control point (SCP) and carrying user-prompting information, wherein the user-prompting information comprises a routing address of the AIP device, an identifier (ID) of the SCP, and a service correlation ID; and forwarding, by the IMS network-side entity, the ETC operation information to the AIP device, so that the AIP device establishes a connection with the SCP according to the user-prompting information carried in the ETC operation information, and interacts with the SCP according to the established connection, and prompts and collects user information.

16. The method according to claim 15, wherein:
the IMS network-side entity is a media gateway control function (MGCF) entity connected to the SCP through a call session control function (CSCF) entity and an Internet Protocol IP Multimedia Service Switch Function (IM-SSF) entity; and
obtaining, by the IMS network-side entity, ETC operation information sent by a service control point SCP and carrying user-prompting information comprises:
obtaining, by the MGCF entity, the ETC operation information forwarded by the IM-SSF entity through the CSCF entity and carrying the user-prompting information, wherein the ETC operation information is sent by the SCP to the IM-SSF entity.

17. The method according to claim 16, wherein:
an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a pre-set rule, and then the CSCF entity sends the ETC operation information to the MGCF entity; and
forwarding, by the IMS network-side entity, the ETC operation information to the AIP device comprises:
sending, by the MGCF entity, an initial address message (IAM) carrying the ETC operation information to the AIP device, so that the AIP device obtains the ETC operation information from the IAM.

18. The method according to claim 15, wherein:
the IMS network-side entity is an Internet Protocol IP Multimedia Service Switch Function (IM-SSF) entity connected to the SCP; and
obtaining, by the IMS network-side entity, ETC operation information sent by a service control point SCP and carrying user-prompting information comprises:
obtaining, by the IM-SSF entity, the ETC operation information sent by the SCP and carrying the user-prompting information.

19. The method according to claim 18, wherein:
an interface between the IM-SSF entity and the SCP is extended to support an ETC operation; and
forwarding, by the IMS network-side entity, the ETC operation information to the AIP device comprises:
sending, by the IM-SSF entity, an initial address message (IAM) carrying the ETC operation information to the AIP device, so that the AIP device obtains the ETC operation information from the IAM.

20. The method according to claim 15, wherein after forwarding, by the IMS network-side entity, the ETC operation information to the AIP device, the method further comprises:
receiving a disconnect forward connection (DFC) instruction delivered by the SCP, and sending a release message (REL) to the AIP device according to the DFC instruction, so that the AIP device releases a resource and disconnects the SCP according to the REL; and
receiving a resource release completion message returned by the ALP device, and returning the resource release completion message to the SCP.

21. An Internet Protocol Multimedia Subsystem (IMS) network-side entity, wherein an advanced intelligent peripheral (ATP) device comprises a pre-stored voice required by a user-information-collection function, and the AIP device is connected to an IMS network through the IMS network-side entity, and the IMS network-side entity comprises:
a memory; and
a processor in communication with the memory, wherein the processor is configured to:
obtain ETC (establish temporary connection) operation information sent by a service control point (SCP) and carrying user-prompting information, wherein the user-prompting information comprises a routing address of the AIP device, an identifier (ID) of the SCP, and a service correlation ID; and
forward the ETC operation information to the AIP device, so that the AIP device establishes a connection with the SCP according to the user-prompting information carried in the ETC operation information, and interacts with the SCP according to the established connection, and prompts and collects user information.

22. The entity according to claim 21, wherein:
the IMS network-side entity is a media gateway control function (MGCF) entity connected to the SCP through a call session control function (CSCF) entity and an Internet Protocol IP Multimedia Service Switch Function (IM-SSF) entity; and
the processor is further configured to:
obtain the ETC operation information forwarded by the IM-SSF entity through the CSCF entity and carrying the user-prompting information, wherein the ETC operation information is sent by the SCP to the IM-SSF entity.

23. The entity according to claim 22, wherein:
an interface between the IM-SSF entity and the SCP is extended to support an ETC operation, the IM-SSF entity sends the ETC operation information to the CSCF entity by extending an interface between the IM-SSF entity and the CSCF entity, or sends the ETC operation information to the CSCF entity in a manner of combining the ETC operation information with a request uniform resource identifier according to a pre-set rule, and then the CSCF entity sends the ETC operation information to the MGCF entity; and
the processor is further configured to:
send an initial address message (JAM) carrying the ETC operation information to the AIP device, so that the AIP device obtains the ETC operation information from the IAM.

24. The entity according to claim 21, wherein:
the IMS network-side entity is an Internet Protocol IP Multimedia Service Switch Function (IM-SSF) entity connected to the SCP; and
the processor is further configured to:
obtain the ETC operation information sent by the SCP and carrying the user-prompting information.

25. The method according to claim 24, wherein:
an interface between the IM-SSF entity and the SCP is extended to support an ETC operation; and
the processor is further configured to:
send an initial address message (JAM) carrying the ETC operation information to the AIP device, so that the AIP device obtains the ETC operation information from the JAM.

26. The entity according to claim 21, wherein the processor is further configured to:
receive a disconnect forward connection (DFC) instruction delivered by the SCP;

send a release message (REL) to the AIP device according to the DFC instruction, so that the AIP device releases a resource and disconnects the SCP according to the REL;

receive a resource release completion message returned by the AIP device; and return the resource release completion message to the SCP.

27. A system for prompting and collecting user information, comprising:

an advanced intelligent peripheral (AIP) device having a pre-stored voice required by a user-information-collection function, a memory, and a processor in communication with the memory, wherein the AIP device is connected to an Internet Protocol Multimedia Subsystem (IMS) network through an IMS network-side entity, and the processor is configured to:

obtain ETC (establish temporary connection) operation information forwarded by the IMS network-side entity and carrying user-prompting information, wherein the ETC operation information is sent by a service control point (SCP), and the user-prompting information comprises a routing address of the AIP device, an identifier (ID) of the SCP, and a service correlation ID;

establish a connection with the SCP through the IMS network-side entity according to the user-prompting information carried in the ETC operation information; and interact with the SCP according to the established connection, and to collect user information; and an Internet Protocol Multimedia Subsystem (IMS) network-side entity.

* * * * *